US012750800B2

(12) United States Patent
Bhamri et al.

(10) Patent No.: US 12,750,800 B2
(45) Date of Patent: Sep. 29, 2026

(54) SYNCHRONIZATION SIGNAL BLOCK GROUPS ASSOCIATED WITH MULTIPLE WAVEFORMS FOR A WIRELESS COMMUNICATION NETWORK SUPPORTING A HIGH FREQUENCY RANGE

(71) Applicant: Lenovo (Singapore) Pte. Ltd., New Tech Park (SG)

(72) Inventors: Ankit Bhamri, Rödermark (DE); Ali Ali, Kraiburg am Inn (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 307 days.

(21) Appl. No.: 18/577,396

(22) PCT Filed: Jul. 6, 2022

(86) PCT No.: PCT/IB2022/056243

§ 371 (c)(1),
(2) Date: Jan. 8, 2024

(87) PCT Pub. No.: WO2023/281414

PCT Pub. Date: Jan. 12, 2023

(65) Prior Publication Data

US 2024/0365260 A1 Oct. 31, 2024

Related U.S. Application Data

(60) Provisional application No. 63/218,830, filed on Jul. 6, 2021.

(51) Int. Cl.

*H04W 56/00* (2009.01)
*H04L 27/26* (2006.01)
*H04W 74/0833* (2024.01)

(52) U.S. Cl.

CPC ... *H04W 56/0015* (2013.01); *H04L 27/26025* (2021.01); *H04L 27/2636* (2013.01); *H04W 74/0833* (2013.01)

(58) Field of Classification Search

CPC ......... H04W 56/0015; H04L 27/26025; H04L 27/2636

See application file for complete search history.

(56) References Cited

U.S. PATENT DOCUMENTS

2018/0287840 A1* 10/2018 Akkarakaran ........ H04L 27/262
2019/0261315 A1 8/2019 Zhang et al.

(Continued)

FOREIGN PATENT DOCUMENTS

WO WO-2021084333 A1 * 5/2021 ............ H04W 72/23

OTHER PUBLICATIONS

PCT/IB2022/056243, "Notification of Transmittal of the International Search Report and the Written Opinion of the International Searching Authority, or the Declaration", International Searching Authority, Oct. 24, 2022, pp. 1-11.

(Continued)

*Primary Examiner* — Charles C Jiang
*Assistant Examiner* — Ryan C Kavleski
(74) *Attorney, Agent, or Firm* — Kunzler Needham & Hilton; Bruce R. Needham

(57) ABSTRACT

Apparatuses, methods, and systems are disclosed for synchronization signal block (SSB) groups associated with multiple waveforms for a wireless communication network associated with a high frequency range. An apparatus includes: a transceiver that receives from a radio access network (RAN) supporting a high frequency range: a first configuration comprising a first indication that a first group of SSBs is associated with a first waveform; a second configuration comprising a second indication that a second (Continued)

group of SSBs is associated with a second, different waveform. The apparatus includes a processor that determines a respective waveform associated with a received SSB based at least in part on an SSB index, the SSB index indicating the respective waveform associated with the received SSB. In some examples, random access channel (RACH) occasions are associated with the received SSB and with different RACH occasion waveform.

20 Claims, 15 Drawing Sheets

(56) References Cited

U.S. PATENT DOCUMENTS

| | | | | |
|---|---|---|---|---|
| 2019/0380144 | A1 | 12/2019 | Luo et al. | |
| 2020/0313835 | A1 | 10/2020 | Ji et al. | |
| 2020/0412590 | A1* | 12/2020 | Akkarakaran | H04L 27/26136 |
| 2022/0200746 | A1* | 6/2022 | Sakhnini | H04L 5/0037 |
| 2024/0147544 | A1* | 5/2024 | Li | H04L 5/0053 |

OTHER PUBLICATIONS

3GPP, "3rd Generation Partnership Project; Technical Specification Group Radio Access Network; Physical layer procedures for shared spectrum channel access (Release 16)", 3GPP TS 37.213 V16.5.0, Mar. 2021, pp. 1-27.

3GPP, "3rd Generation Partnership Project; Technical Specification Group Radio Access Network; NR; Physical channels and modulation (Release 16)", 3GPP TS 38.211 V16.5.0, Mar. 2021, pp. 1-134.

3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.

3GPP, "3rd Generation Partnership Project; Technical Specification Group Radio Access Network; NR; Physical layer procedures for control (Release 16)", 3GPP TS 38.213 V16.5.0, Mar. 2021, pp. 1-183.

* cited by examiner

_ServingCellConfigCommonSIB_ information element 300

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB                 OPTIONAL, -- Need R
    supplementaryUplink                 UplinkConfigCommonSIB                 OPTIONAL, -- Need R
    n-TimingAdvanceOffset               ENUMERATED { n0, n25600, n39936 }     OPTIONAL, -- Need S
    ssb-PositionsInBurst                SEQUENCE {
        inOneGroup                          BIT STRING (SIZE (8)),
        groupPresence                       BIT STRING (SIZE (8)              OPTIONAL  -- Cond FR2-Only
    },
    ssb-PeriodicityServingCell          ENUMERATED {ms5, ms10, ms20, ms40, ms80, ms160},
    tdd-UL-DL-ConfigurationCommon       TDD-UL-DL-ConfigCommon                OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                                   OPTIONAL, -- Cond
SharedSpectrum
    discoveryBurstWindowLength-r16      ENUMERATED {ms0dot5, ms1, ms2, ms3, ms4, ms5}
                                                                              OPTIONAL, -- Need R
    highSpeedConfig-r16                 HighSpeedConfig-r16                   OPTIONAL  -- Need R
    ]]
}

-- TAG-SERVINGCELLCONFIGCOMMONSIB-STOP
-- ASN1STOP
```

FIG. 3

400

| ***ServingCellConfigCommonSIB* fields/parameters** |
|---|
| ***discoveryBurstWindowLength* <u>402</u>**<br>Indicates the window length of the discovery burst in ms (*see* TS 37.213). |
| ***ssb-PositionsInBurst* <u>404</u>**<br>Time domain positions of the transmitted SS-blocks in an SS-burst as defined in TS 38.213 [13], clause 4.1. For operation with shared spectrum channel access, only *mediumBitmap* is used. The UE assumes that a bit at position k > NQCL SSB is 0, where is obtained from *MIB* as specified in TS 38.213 [13], clause 4.1. For operation with shared spectrum channel access, only *inOneGroup* is used and the UE interprets this field same as *mediumBitmap* in *ServingCellConfigCommon*. |
| ***inOneGroup* <u>406</u>**<br>When maximum number of SS/PBCH blocks per half frame equals to 4 as defined in TS 38.213, clause 4.1, only the 4 leftmost bits are valid; the UE ignores the 4 rightmost bits. When maximum number of SS/PBCH blocks per half frame equals to 8 as defined in TS 38.213, clause 4.1, all 8 bits are valid. The first/ leftmost bit corresponds to SS/PBCH block index 0, the second bit corresponds to SS/PBCH block index 1, and so on. When maximum number of SS/PBCH blocks per half frame equals to 64 as defined in TS 38.213, clause 4.1, all 8 bits are valid; The first/ leftmost bit corresponds to the first SS/PBCH block index in the group (i.e., to SSB index 0, 8, and so on); the second bit corresponds to the second SS/PBCH block index in the group (i.e., to SSB index 1, 9, and so on), and so on. Value 0 in the bitmap indicates that the corresponding SS/PBCH block is not transmitted while value 1 indicates that the corresponding SS/PBCH block is transmitted. |
| ***groupPresence* <u>408</u>**<br>This field is present when maximum number of SS/PBCH blocks per half frame equals to 64 as defined in TS 38.213, clause 4.1. The first/leftmost bit corresponds to the SS/PBCH index 0-7, the second bit corresponds to SS/PBCH block 8-15, and so on. Value 0 in the bitmap indicates that the SSBs according to *inOneGroup* are absent. Value 1 indicates that the SS/PBCH blocks are transmitted in accordance with *inOneGroup*. |

FIG. 4

***RACH-ConfigCommon* information element 500**

```
-- ASN1START
-- TAG-RACH-CONFIGCOMMON-START
RACH-ConfigCommon ::=            SEQUENCE {
    rach-ConfigGeneric               RACH-ConfigGeneric,
    totalNumberOfRA-Preambles        INTEGER (1..63)                                OPTIONAL,   -- Need S
    ssb-perRACH-OccasionAndCB-PreamblesPerSSB   CHOICE {
        oneEighth                        ENUMERATED {n4,n8,n12,n16,n20,n24,n28,n32,n36,n40,n44,n48,n52,n56,n60,n64},
        oneFourth                        ENUMERATED {n4,n8,n12,n16,n20,n24,n28,n32,n36,n40,n44,n48,n52,n56,n60,n64},
        oneHalf                          ENUMERATED {n4,n8,n12,n16,n20,n24,n28,n32,n36,n40,n44,n48,n52,n56,n60,n64},
        one                              ENUMERATED {n4,n8,n12,n16,n20,n24,n28,n32,n36,n40,n44,n48,n52,n56,n60,n64},
        two                              ENUMERATED {n4,n8,n12,n16,n20,n24,n28,n32},
        four                             INTEGER (1..16),
        eight                            INTEGER (1..8),
        sixteen                          INTEGER (1..4)
    }                                                                               OPTIONAL,   -- Need M
    groupBconfigured                 SEQUENCE {
        ra-Msg3SizeGroupA                ENUMERATED {b56, b144, b208, b256, b282, b480, b640,b800,b1000,
                                             b72, spare6, spare5,spare4, spare3, spare2, spare1},
        messagePowerOffsetGroupB         ENUMERATED { minusinfinity, dB0, dB5, dB8, dB10, dB12, dB15, dB18},
        numberOfRA-PreamblesGroupA       INTEGER (1..64)
    }                                                                               OPTIONAL,   -- Need R
    ra-ContentionResolutionTimer     ENUMERATED { sf8, sf16, sf24, sf32, sf40, sf48, sf56, sf64},
    rsrp-ThresholdSSB                RSRP-Range                                     OPTIONAL,   -- Need R
    rsrp-ThresholdSSB-SUL            RSRP-Range                                     OPTIONAL, -- Cond SUL
    prach-RootSequenceIndex          CHOICE {
        l839                             INTEGER (0..837),
        l139                             INTEGER (0..137)
    },
    msg1-SubcarrierSpacing           SubcarrierSpacing                              OPTIONAL,-- Cond L139
    restrictedSetConfig              ENUMERATED {unrestrictedSet, restrictedSetTypeA, restrictedSetTypeB},
    msg3-transformPrecoder           ENUMERATED {enabled}                           OPTIONAL,   -- Need R
    ...,
    [[
    ra-PrioritizationForAccessIdentity-r16  SEQUENCE {
        ra-Prioritization-r16            RA-Prioritization,
        ra-PrioritizationForAI-r16       BIT STRING (SIZE (2))
    }                                                                    OPTIONAL, -- Cond InitialBWP-Only
    prach-RootSequenceIndex-r16      CHOICE {
        l571                             INTEGER (0..569),
        l1151                            INTEGER (0..1149)
    }   OPTIONAL    -- Need R
    ]]
}
-- TAG-RACH-CONFIGCOMMON-STOP
-- ASN1STOP
```

FIG. 5

**Example 1-1 *ServingCellConfigCommonSIB* information element 600**

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB            OPTIONAL, -- Need R
    supplementaryUplink                 UplinkConfigCommonSIB            OPTIONAL, -- Need R
    n-TimingAdvanceOffset               ENUMERATED { n0, n25600, n39936 } OPTIONAL, -- Need S
    ssb-PositionsInBurst                SEQUENCE {
        inOneGroup                          BIT STRING (SIZE (8)),
        groupPresence                       BIT STRING (SIZE (8))        OPTIONAL  -- Cond FR2-Only
    },
    ssb-Waveform-PositionsInBurst       SEQUENCE {                 OPTIONAL  -- Cond multi-waveform
        inOneGroup                          BIT STRING (SIZE (8)),
        groupPresence                       BIT STRING (SIZE (8))        OPTIONAL  -- Cond FR2-Only
    },
    ssb-PeriodicityServingCell          ENUMERATED {ms5, ms10, ms20, ms40, ms80, ms160},
    tdd-UL-DL-ConfigurationCommon       TDD-UL-DL-ConfigCommon                     OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                          OPTIONAL, -- Cond
SharedSpectrum
    discoveryBurstWindowLength-r16      ENUMERATED {ms0dot5, ms1, ms2, ms3, ms4, ms5}
                                                                     OPTIONAL, -- Need R
    highSpeedConfig-r16                 HighSpeedConfig-r16                OPTIONAL  -- Need R
    ]]
}
-- TAG-SERVINGCELLCONFIGCOMMONSIB-STOP
-- ASN1STOP
```

605

602

FIG. 6

**Example 1-2 *ServingCellConfigCommonSIB* information element 700**

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB                 OPTIONAL, -- Need R
    supplementaryUplink                 UplinkConfigCommonSIB                 OPTIONAL, -- Need R
    n-TimingAdvanceOffset               ENUMERATED { n0, n25600, n39936 }     OPTIONAL, -- Need S
    ssb-PositionsInBurst                SEQUENCE {
        inOneGroup                          BIT STRING (SIZE (8)),
        groupPresence                       BIT STRING (SIZE (8))             OPTIONAL  -- Cond FR2-Only
    },
    ssb-Waveform-PositionsInBurst       SEQUENCE {                            OPTIONAL  -- Cond multi-waveform
        inOneGroup                          BIT STRING (SIZE (8)),
        groupPresence                       BIT STRING (SIZE (8))             OPTIONAL  -- Cond FR2-Only
    },
    Waveform-Alternate                  ENUMERATED {enable,disable}           OPTIONAL, -- Cond multi-waveform
    ssb-PeriodicityServingCell          ENUMERATED {ms5, ms10, ms20, ms40, ms80, ms160},
    tdd-UL-DL-ConfigurationCommon       TDD-UL-DL-ConfigCommon                         OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                       OPTIONAL, -- Cond SharedSpectrum
    discoveryBurstWindowLength-r16      ENUMERATED {ms0dot5, ms1, ms2, ms3, ms4, ms5}
                                                                            OPTIONAL, -- Need R
    highSpeedConfig-r16                 HighSpeedConfig-r16                 OPTIONAL  -- Need R
    ]]
}
-- TAG-SERVINGCELLCONFIGCOMMONSIB-STOP
-- ASN1STOP
```

702
704
705

FIG. 7

**Example 1-3 *ServingCellConfigCommonSIB* information element 800**

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB                OPTIONAL, -- Need R
    supplementaryUplink                 UplinkConfigCommonSIB                OPTIONAL, -- Need R
    n-TimingAdvanceOffset               ENUMERATED { n0, n25600, n39936 }    OPTIONAL, -- Need S
    ssb-Set1Waveform                    CHOICE {CP-OFDM, DFT-s-OFDM}   OPTIONAL  -- Cond multi-waveform
    ssb-Set1-PositionsInBurst           SEQUENCE {
        inOneGroup                          BIT STRING (SIZE (8)),
        groupPresence                       BIT STRING (SIZE (8))     OPTIONAL  -- Cond FR2-Only
    },
    ssb-Set2Waveform                    CHOICE {CP-OFDM, DFT-s-OFDM}   OPTIONAL  -- Cond multi-waveform
    ssb-Set2-PositionsInBurst           SEQUENCE {                     OPTIONAL  -- Cond multi-waveform
        inOneGroup                          BIT STRING (SIZE (8)),
        groupPresence                       BIT STRING (SIZE (8))     OPTIONAL  -- Cond FR2-Only
    },
    ssb-PeriodicityServingCell          ENUMERATED {ms5, ms10, ms20, ms40, ms80, ms160},
    tdd-UL-DL-ConfigurationCommon       TDD-UL-DL-ConfigCommon                     OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                          OPTIONAL, -- Cond
SharedSpectrum
    discoveryBurstWindowLength-r16      ENUMERATED {ms0dot5, ms1, ms2, ms3, ms4, ms5}
                                                                OPTIONAL, -- Need R
    highSpeedConfig-r16                 HighSpeedConfig-r16                  OPTIONAL  -- Need R
    ]]
}
-- TAG-SERVINGCELLCONFIGCOMMONSIB-STOP
-- ASN1STOP
```

805 802 806 804 808

FIG. 8

**Example 2-1 *ServingCellConfigCommonSIB* information element 900**

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB                   OPTIONAL, -- Need R
    supplementaryUplink                 UplinkConfigCommonSIB                   OPTIONAL, -- Need R
    n-TimingAdvanceOffset               ENUMERATED { n0, n25600, n39936 }       OPTIONAL, -- Need S
    ssb-PositionsInBurst                SEQUENCE {
        inOneGroup                          BIT STRING (SIZE (8)),
        groupPresence                       BIT STRING (SIZE (8))               OPTIONAL  -- Cond FR2-Only
    },

    ssb-CPOFDM-PeriodicityServingCell   ENUMERATED {ms5, ms10, ms20, ms40, ms80, ms160},
    ssb-DFTsOFDM-PeriodicityServingCell ENUMERATED {ms5, ms10, ms20, ms40, ms80, ms160},
                                                                     OPTIONAL,--Cond multi-waveform

    ssb-PeriodicityServingCell          ENUMERATED {ms5, ms10, ms20, ms40, ms80, ms160},
    tdd-UL-DL-ConfigurationCommon       TDD-UL-DL-ConfigCommon                        OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                             OPTIONAL, -- Cond
SharedSpectrum
    discoveryBurstWindowLength-r16      ENUMERATED {ms0dot5, ms1, ms2, ms3, ms4, ms5}
                                                                  OPTIONAL, -- Need R
    highSpeedConfig-r16                 HighSpeedConfig-r16                     OPTIONAL  -- Need R
    ]]
}
-- TAG-SERVINGCELLCONFIGCOMMONSIB-STOP
-- ASN1STOP
```

902

904

906

FIG. 9

**Example 2-1 *ServingCellConfigCommonSIB* information element 1000**

```
-- ASN1START
-- TAG-SERVINGCELLCONFIGCOMMONSIB-START

ServingCellConfigCommonSIB ::=      SEQUENCE {
    downlinkConfigCommon                DownlinkConfigCommonSIB,
    uplinkConfigCommon                  UplinkConfigCommonSIB                OPTIONAL, -- Need R
    supplementaryUplink                 UplinkConfigCommonSIB                OPTIONAL, -- Need R
    n-TimingAdvanceOffset               ENUMERATED { n0, n25600, n39936 }    OPTIONAL, -- Need S
    ssb-PositionsInBurst                SEQUENCE {
        inOneGroup                          BIT STRING (SIZE (8)),
        groupPresence                       BIT STRING (SIZE (8))            OPTIONAL  -- Cond FR2-Only
    },
    ssb-PeriodicityServingCell        ENUMERATED {ms5, ms10, ms20, ms40, ms80, ms160},
    ssb-PeriodicityFactorServingCell   INTEGER (1..N)                  OPTIONAL, -- Cond multi-waveform
    tdd-UL-DL-ConfigurationCommon       TDD-UL-DL-ConfigCommon                     OPTIONAL, -- Cond TDD
    ss-PBCH-BlockPower                  INTEGER (-60..50),
    ...,
    [[
    channelAccessMode-r16               CHOICE {
        dynamic                             NULL,
        semiStatic                          SemiStaticChannelAccessConfig-r16
    }                                                                              OPTIONAL, -- Cond
SharedSpectrum
    discoveryBurstWindowLength-r16      ENUMERATED {ms0dot5, ms1, ms2, ms3, ms4, ms5}
                                                                        OPTIONAL, -- Need R
    highSpeedConfig-r16                 HighSpeedConfig-r16                  OPTIONAL  -- Need R
    ]]
}
-- TAG-SERVINGCELLCONFIGCOMMONSIB-STOP
-- ASN1STOP
```

1002

1004

FIG. 10

1100

1104

1106

1102

```
-- ASN1START
-- TAG-RACH-CONFIGCOMMON-START
RACH-ConfigCommon ::=             SEQUENCE {
  rach-ConfigGeneric                 RACH-ConfigGeneric,
  totalNumberOfRA-Preambles          INTEGER (1..63)                    OPTIONAL,   -- Need S
  ssb-perRACH-OccasionAndCB-PreamblesPerSSB   CHOICE {
      oneEighth                   ENUMERATED {n4,n8,n12,n16,n20,n24,n28,n32,n36,n40,n44,n48,n52,n56,n60,n64},
      oneFourth                   ENUMERATED {n4,n8,n12,n16,n20,n24,n28,n32,n36,n40,n44,n48,n52,n56,n60,n64},
      oneHalf                     ENUMERATED {n4,n8,n12,n16,n20,n24,n28,n32,n36,n40,n44,n48,n52,n56,n60,n64},
      one                         ENUMERATED {n4,n8,n12,n16,n20,n24,n28,n32,n36,n40,n44,n48,n52,n56,n60,n64},
      two                         ENUMERATED {n4,n8,n12,n16,n20,n24,n28,n32},
      four                        INTEGER (1..16),
      eight                       INTEGER (1..8),
      sixteen                     INTEGER (1..4)
  }                                                                     OPTIONAL,   -- Need M
  groupBconfigured                SEQUENCE {
      ra-Msg3SizeGroupA           ENUMERATED {b56, b144, b208, b256, b282, b480, b640,
                                            b800, b1000, b72, spare6, spare5,spare4, spare3, spare2, spare1},
      messagePowerOffsetGroupB    ENUMERATED { minusinfinity, dB0, dB5, dB8, dB10, dB12, dB15, dB18},
      numberOfRA-PreamblesGroupA  INTEGER (1..64)
  }                                                                     OPTIONAL,   -- Need R
  ra-ContentionResolutionTimer    ENUMERATED { sf8, sf16, sf24, sf32, sf40, sf48, sf56, sf64},
  rsrp-ThresholdSSB               RSRP-Range                            OPTIONAL,   -- Need R
  rsrp-ThresholdSSB-SUL                   RSRP-Range                    OPTIONAL,   -- Cond SUL
  prach-RootSequenceIndex                 CHOICE {
      1839                                    INTEGER (0..837),
      1139                                    INTEGER (0..137)
  },
  RACH-OccasionWaveform               CHOICE {CP-OFDM, DFT-s-OFDM}      OPTIONAL   -- Cond multi-waveform
  msg1-SubcarrierSpacing                  SubcarrierSpacing             OPTIONAL   ,   -- Cond L139
  restrictedSetConfig                     ENUMERATED {unrestrictedSet, restrictedSetTypeA, restrictedSetTypeB},
  msg3-transformPrecoder                  ENUMERATED {enabled}         OPTIONAL,   -- Need R
  ..., [[
  ra-PrioritizationForAccessIdentity-r16  SEQUENCE {
      ra-Prioritization-r16                   RA-Prioritization,
      ra-PrioritizationForAI-r16              BIT STRING (SIZE (2))
  }                                                                    OPTIONAL,   -- Cond InitialBWP-Only
  prach-RootSequenceIndex-r16             CHOICE {
      1571                                    INTEGER (0..569),
      11151                                   INTEGER (0..1149)
  }  ]] OPTIONAL    -- Need R
}
-- TAG-RACH-CONFIGCOMMON-STOP
-- ASN1STOP
```

FIG. 11

SYNCHRONIZATION SIGNAL BLOCK GROUPS ASSOCIATED WITH MULTIPLE WAVEFORMS FOR A WIRELESS COMMUNICATION NETWORK SUPPORTING A HIGH FREQUENCY RANGE

CROSS-REFERENCE TO RELATED APPLICATIONS

This application claims priority to U.S. Provisional Patent Application No. 63/218,830 titled "SSBs AND ROs WITH MULTIPLE WAVEFORMS FOR HIGH FREQUENCY RANGE" and filed on Jul. 6, 2021, for Ankit Bhamri, Ali Ali, and Sher Ali Cheema, which application is incorporated herein by reference.

FIELD

The subject matter disclosed herein relates generally to wireless communications and more particularly relates to synchronization signal block ("SSB") groups associated with multiple waveforms for a wireless communication network supporting a high frequency range.

BACKGROUND

For Third Generation Partnership Project ("3GPP") New Radio ("NR"), i.e., 5$^{th}$ generation) Radio Access Technology ("RAT"), densely deployed network nodes and relatively high power consumption per node from massive Multiple-In/Multiple-Out ("MIMO") and/or high frequency band operations may lead to increased power consumption by network infrastructure. For example, a gNB (i.e., 5$^{th}$ generation base station) may use a single type of waveform such as Cyclic-Prefix Orthogonal Frequency Division Multiplexing ("CP-OFDM") for transmitting SSBs and other initial access channels/signals. However, for high frequencies (e.g., greater than 52.6 GHz or greater than 71 GHz), waveforms useful for prior wireless communication networks may have drawbacks.

BRIEF SUMMARY

Disclosed are solutions for SSB groups associated with multiple waveforms for a wireless communication network supporting a high frequency range. An apparatus for wireless communication over a high frequency range,, according to one or more examples of the present disclosure, includes: a transceiver, e.g., at a user equipment ("UE"), that receives a first configuration comprising a first indication that a first group of SSBs is associated with a first waveform: a second configuration comprising a second indication that a second group of SSBs is associated with a second waveform different than the first waveform. The apparatus includes a processor that determines a waveform associated with a received SSB based at least in part on an SSB index assigned to indicate the waveform associated with the received SSB.

A method for wireless communication over a high frequency range, at a UE, in one or more examples of the present disclosure includes: receiving a first configuration including an first indication that a first group of SSBs is associated with a first waveform: receiving a second configuration including a second indication that a second group of SSBs is associated with a second waveform different from the first waveform: and determining a waveform associated with the received SSB from based at least in part on an SSB index indicating that the waveform is associated with the received SSB.

In one or more examples of the present disclosure, an apparatus for wireless communication over a high frequency range, e.g., at a radio access network, includes a transceiver, a transceiver that transmits: a first configuration including a first indication that a first group of SSBs is associated with a first waveform: a second configuration including a second indication that a second group of SSBs is associated with a second waveform different than the first waveform; and an SSB wherein a waveform associated with the transmitted SSB is configured to be determined when received based at least in part on an SSB index of the transmitted SSB.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating a ServingCellConfigCommonSIB information element, according to one or more examples of the disclosure:

FIG. 4 is a diagram illustrating parameters of a ServingCellConfigCommonSIB information element, according to one or more examples of the disclosure, according to one or more examples of the disclosure:

FIG. 5 is a diagram illustrating a RACH-ConfigCommon information element, according to one or more examples of the disclosure, according to one or more examples of the disclosure:

FIG. 6 is a diagram illustrating a modified ServingCellConfigCommonSIB information element for waveform-based SSB indexing & grouping signaling, according to one or more examples of the disclosure;

FIG. 7 is a diagram illustrating a modified ServingCellConfigCommonSIB information element for alternating of waveform on SSB indices/beams in alternate periods, according to one or more examples of the disclosure:

FIG. 8 is a diagram illustrating another modified ServingCellConfigCommonSIB information element for separate set of SSB indices are indicated to for associating to different waveforms, according to one or more examples of the disclosure;

FIG. 9 is a diagram illustrating a further modified ServingCellConfigCommonSIB information element for implementing waveform-periodicity according to one or more examples of the disclosure:

FIG. 10 is a diagram illustrating another modified ServingCellConfigCommonSIB information element for implementing waveform-periodicity according to one or more examples of the disclosure:

FIG. 11 is a diagram illustrating a modified RACH-ConfigCommon information element, according to one or more examples of the disclosure:

DETAILED DESCRIPTION

Figure 1:
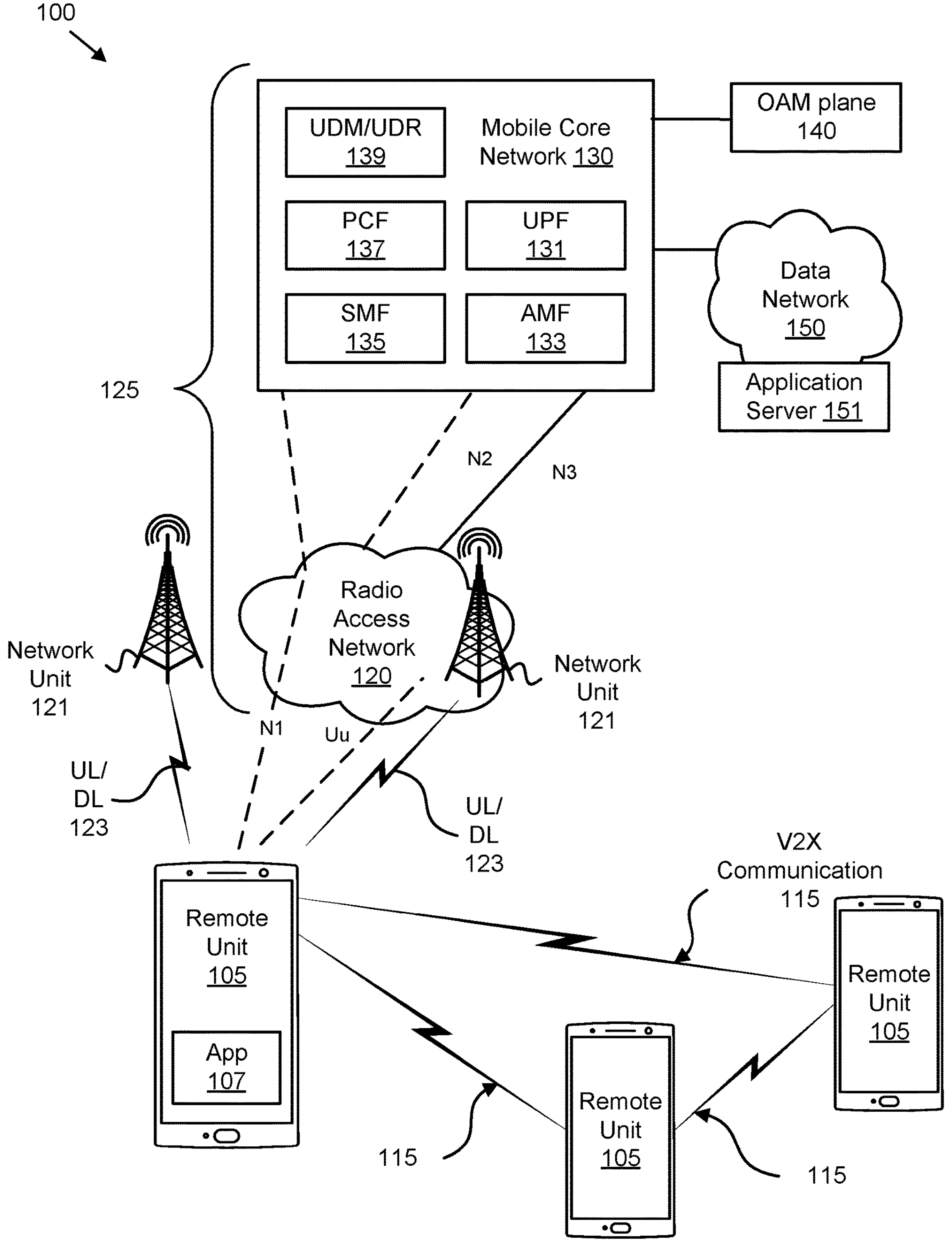
FIG. 1 is a schematic block diagram illustrating mobile communication system for SSB groups associated with multiple waveforms for a wireless communication network supporting a high frequency range, according to one or more examples of the disclosure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom Very-Large-Scale Integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an Erasable Programmable Read-Only Memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), Wireless LAN ("WLAN"), or a Wide Area Network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B, and/or C includes only A, only B, only C, a combination of A and B, a combination of B and C, a combination of A and C, or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C, or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C, or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for to enhance SSBs and ROs with multiple waveforms for wireless communication network supporting high frequency ranges. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions. Described herein are detailed signaling enhancements on how to deal with the issue of SSB beams association with specific waveform and how to indicate/configure to UEs. Furthermore, additional details as proposed for optimizing transmissions depending on how certain waveform type performs with certain frequency range, subcarrier spacing values, and other applicable parameters.

In New Radio (NR) (e.g., Rel-18 or beyond), one or more additional/new waveforms may be considered for NR operation at high frequencies, such as for example, frequencies greater than 71 GHz.

In certain existing wireless communication networks, only Cyclic Prefix Orthogonal Frequency Division Multiplexing ("CP-OFDM") is supported for downlink. However, in accordance with one or more examples of the present disclosure, for future networks, such as future releases of NR, any new waveform, such as for example, Discrete Fourier Transform Spread Orthogonal Frequency Division Multiplexing ("DFT-s-OFDM"), Single-Carrier Frequency-Domain-Equalization ("SC-FDE"), Single Carrier Quadrature Amplitude Modulation ("SC-QAM") or some other single carrier waveforms may be specified for 5G-Advanced in addition to CP-OFDM.

Consequently, the need to support two or more different waveforms may impact transmission/reception of SSBs and other initial access channels/signals as these will also be expected to support more than one waveform. The present disclosure provides various solutions to avoid ambiguity in association of SSB beams/indices to different waveforms. As used herein the terms waveform and waveforms may also be referred to as waveform type and waveform types unless otherwise clear from context. In existing mobile communication systems, no indication/signaling exists to indicate a waveform for SSB transmission/reception.

According to a first solution, joint indexing of SSB is applied for different waveforms. Here, the association of an SSB index to one of the waveforms is indicated via high layer signaling. Joint indexing of SSB implies that a single set of indices, for example 0-63, is applied, where some indices are associated with one waveform, while other indices are associated with another waveform.

According to a second solution, SSBs transmitted with certain waveforms can have different periodicities associated with them. As an illustrative example, when an SSB can be transmitted with two different waveforms such as CP-OFDM and DFT-s-OFDM, then two periodicities may be configured by network to the UE in the ServingCellConfigCommonSIB information element via RRC signaling.

According to a third solution, a waveform for a RO can be determined based on the associated waveform of the received SSB beam. Here, in one example, if the SSB beam (index) is received using one waveform by the UE, then UE is expected to transmit on the associated RO(s) with the same waveform. In this case, no explicit configuration for RACH is needed to indicate which waveform to use, consistency with the received SSB waveform is assumed. Additional details regarding various solutions are described in more detail.

FIG. 1 depicts a wireless communication system 100 supporting SSBs and ROs with multiple waveforms for high frequency range, according to one or more examples of the disclosure. In various examples, the wireless communication system 100 includes at least one remote unit 105, a RAN 120 (e.g., a NG-RAN), and a mobile core network 130. The RAN 120 and the mobile core network 130 form a wireless communication network 125. The RAN 120 may be composed of a network unit 121. Even though a specific number of remote units 105, RANs 120, and mobile core networks 130 are depicted in FIG. 1, one of skill in the art will recognize that any number of remote units 105, RANs 120, and mobile core networks 130 may be included in the wireless communication system 100.

In some implementations, the RAN 120 is compliant with the 5G system specified in the Third Generation Partnership Project ("3GPP") specifications. For example, the RAN 120 may be a New Generation Radio Access Network ("NG-RAN"), implementing NR Radio Access Technology ("RAT") and/or 3GPP Long-Term Evolution ("LTE") RAT. In some examples, the RAN 120 may include non-3GPP RAT (e.g., Wi-FiR or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one or more embodiments, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, Wireless Transmit/Receive Unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with the network units 121 in the RAN 120 via uplink ("UL") and downlink ("DL") communication signals. Furthermore, the UL and DL communication signals may be carried over the wireless communication links 123. Here, RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, email client, telephone and/or Voice-over-Internet-Protocol ("VoIP") application) in a remote unit 105 may trigger the remote unit 105 to establish a Protocol Data Unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session or Packet Data Network ("PDN") connection, the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QOS Flow have the same 5G QOS Identifier ("5Q1").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW") (not shown) in the mobile core network 130. In certain embodiments, there is a one-to-one mapping between an EPS Bearer and a QoS profile, such that all packets belonging to a specific EPS Bearer have the same QoS Class Identifier ("QCI").

The network units 121 may be distributed over a geographic region. In certain embodiments, a network unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The network units 121 are generally part of a RAN, such as the RAN 120, that may include one or more controllers communicably coupled to one or more corresponding network units 121. These and other elements of radio access network are not illustrated but are well known generally by those having ordinary skill in the art. The network units 121 connect to the mobile core network 130 via the RAN 120.

The network units 121 may serve a number of remote units 105 within a serving area, for example, a cell or a cell sector, via a wireless communication link 123. In some examples, the remote units 105 may communicate with each other, e.g., via vehicle-to-everything ("V2X") communication 115. The network units 121 may communicate directly with one or more of the remote units 105 via communication signals. Generally, the network units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the network units 121. Note that during NR in Unlicensed Spectrum ("NR-U") operation, the network unit 121 and the remote unit 105 communicate over unlicensed radio spectrum.

In one or more embodiments, the mobile core network 130 is a 5G Core network ("5GC") or an Evolved Packet Core network ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, a Unified Data Management function ("UDM") and a User Data Repository ("UDR").

The UPF 131 is responsible for packet routing and forwarding, packet inspection, QoS handling, and external PDU session for interconnecting Data Network (DN), in the 5G architecture. The AMF 133 is responsible for termination of Network Attached Storage ("NAS") signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The PCF 137 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF"), which provides NF service registration and discovery, enabling NFs to identify appropriate services in one another and communicate with each other over Application Programming Interfaces ("APIs"), a Network Exposure Function ("NEF"), which is responsible for making network data and resources easily accessible to customers and network partners, or other NFs defined for the 5GC. In certain embodiments, the mobile core network 130 may include an Authentication, Authorization, and Accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a Single-Network Slice Selection Assistance Information ("S-NSSAI,") while a set of network slices for which the remote unit 105 is authorized to use is identified by Network Slice Selection Assistance Information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

The Operations, Administration and Maintenance ("OAM") plane 140 is involved with the operating, administering, managing and maintaining of the wireless communication system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM plane 140 may also be involved with provisioning, i.e., the setting up of the user accounts, devices and services.

While FIG. 1 depicts components of a 5G RAN and a 5G core network, the described embodiments apply to other types of communication networks and RATs, including IEEE 802.11 variants, Global System for Mobile Communications ("GSM") (i.e., a 2G digital cellular network), General Packet Radio Service ("GPRS"), Universal Mobile Telecommunications System ("UMTS"), LTE variants, Code Division Multiple Access ("CDMA") 2000, Bluetooth®, ZigBee®, Sigfox®, and the like.

In some existing systems, such as for example NR Rel. 15 UL, multiple waveforms may be used. A gNB switches between multicarrier CP-OFDM and single carrier DFT-s-OFDM via RRC configurations. The higher layer parameter transformPrecoder in pusch-Config/configuredGrantConfig or msg3-transformPrecoder in RACH-ConfigCommon provide the indication to enable or disable the transform precoder for Physical Uplink Shared Channel ("PUSCH"). The remote unit 105 (e.g., UE) considers the transform precoding either 'enabled' or 'disabled' based on reading these messages, and the network unit 121 (e.g., gNB) applies simultaneous receptions of multiple UEs with different waveforms.

The procedures disclosed herein provide detailed signaling enhancements on how to deal with the issue of SSB beams association with various specific waveforms and how to indicate/configure to remote units 105 (UEs). Furthermore, additional details are proposed for optimizing transmissions depending on how certain waveforms perform with certain frequency range, subcarrier spacing values, etc.

In the following descriptions, the term "gNB" is used for the base station but it is replaceable by any other radio access node, e.g., RAN node, eNB, Base Station ("BS"), Access Point ("AP"), NR/5G BS, etc. Further the operations are described mainly in the context of 5G NR. However, the described solutions/methods are also equally applicable to other mobile communication systems supporting SSBs and ROs with multiple waveforms for high frequency range.

In one or more examples, a remote unit 105 may be used for receiving from a RAN 120 supporting a high frequency range, a first configuration including an indication that a first group of SSBs is associated with a first waveform: receiving from the RAN a second configuration including an indication that at least a second group of SSBs is associated with at least a second waveform different from the first waveform: and determining a waveform associated with at least one received SSB from the network based at least in part on an SSB index assigned to indicate the waveform associated with the at least one received SSB.

In certain examples, a remote unit 105 may be used for determining a periodicity that configured by a network unit 121 for an SSB group associated with a selected waveform based on a frequency range, a carrier frequency, a frequency raster, a subcarrier spacing, or a combination thereof.

In various examples, a remote unit 105 may be used for determining for each of one or more repeated SSB indices that a waveform is associated with one or more separate ROs and that each RO is associated with the waveform corresponding to the at least one received SSB. A transceiver of the remote unit 105 may use the waveform associated with a selected RO for UL transmission in a RACH procedure.

In one or more examples, a network unit 121 may be used for transmitting a first configuration including an indication that a first group of SSBs is associated with a first waveform; transmitting a second configuration including an indication that at least a second group of SSBs is associated with at least a second waveform different from the first waveform: and transmitting an SSB where a waveform associated with the SSB is determinable by the UE based at least in part on an SSB index of the SSB transmitted to the UE.

In certain examples, a network unit 121 may be used for configuring a periodicity for an SSB group associated with a selected waveform based on a frequency range, a carrier frequency, a frequency raster, a subcarrier spacing, or a combination thereof.

In various examples, a network unit 121 may be used for assigning SSB indices to a waveform that may be associated with one or more separate ROs.

Figure 2:
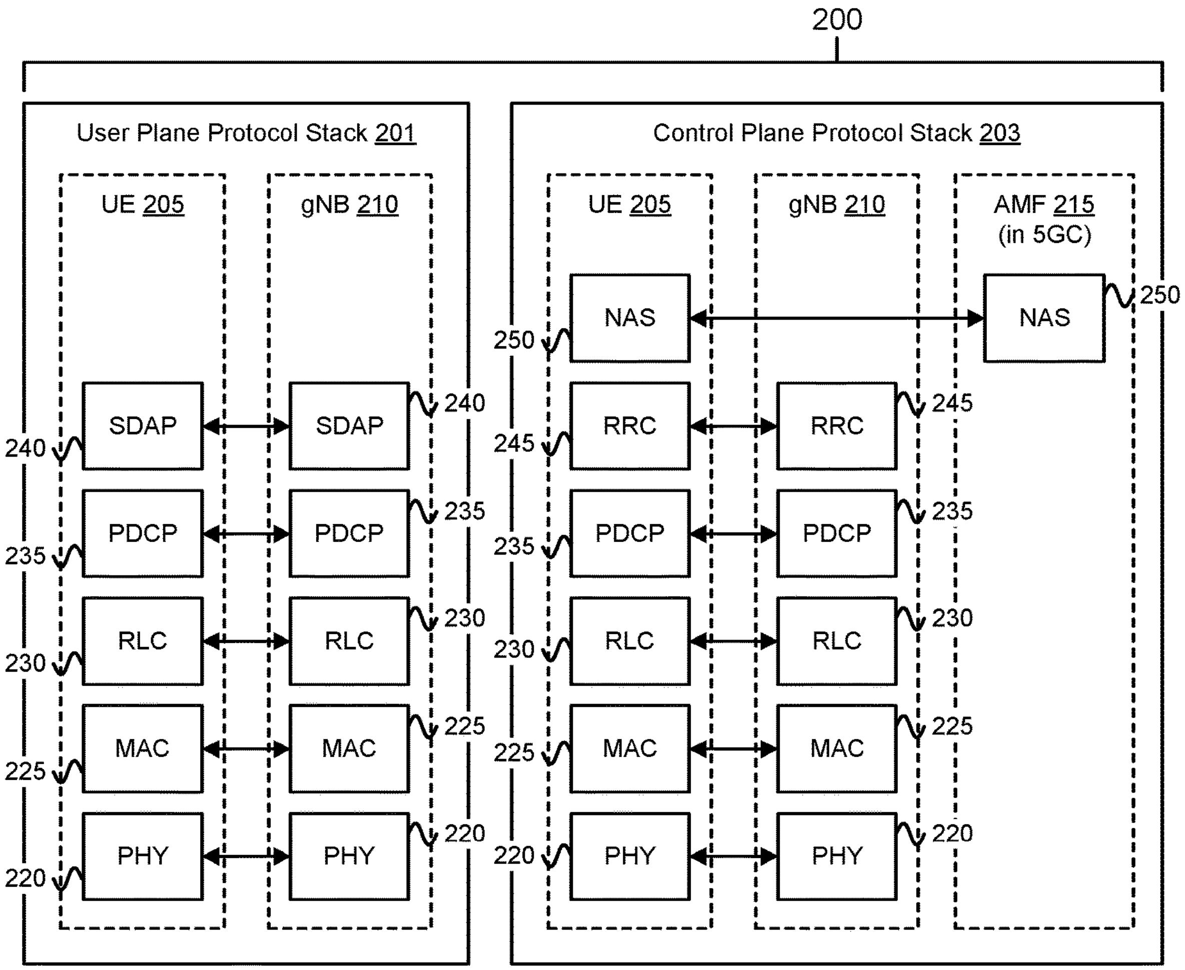
FIG. 2 is a diagram illustrating a NR protocol stack, according to one or more examples of the disclosure.

FIG. 2 depicts a protocol stack 200 for NR, according to embodiments of the disclosure. While FIG. 2 shows the UE 205, the RAN node (e.g., gNB 210) and an AMF 215 in a 5G core network ("5GC"), these are representative of a set of remote units 105 interacting with a network unit 121 and a mobile core network 130. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, a Radio Link Control ("RLC") sublayer 230, a Packet Data Convergence Protocol ("PDCP") sublayer 235, and Service Data Adaptation Protocol ("SDAP") sublayer 240. The Control Plane protocol stack 203 also includes a PHY layer 220, a MAC sublayer 225, a RLC sublayer 230, and a PDCP sublayer 235. The Control Plane protocol stack 203 also includes a Radio Resource Control ("RRC") sublayer 245 and a Non-Access Stratum ("NAS") layer 250.

The AS protocol stack for the Control Plane protocol stack 203 consists of at least RRC, PDCP, RLC and MAC sublayers, and the physical layer. The AS protocol stack for the User Plane protocol stack 201 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer or PDU Layer (note depicted) for the user plane. L1 and L2 are referred to as "lower layers" such as Physical Uplink Control Channel ("PUCCH")/Physical Uplink Shared Channel ("PUSCH") or MAC Control Element ("CE"), while L3 and above (e.g., IP layer, transport layer (e.g., Transmission Control Protocol ("TCP"), User Datagram Protocol ("UDP"), Datagram Congestion Control Protocol ("DCCP"), Stream Control Transmission Protocol ("SCTP"), application layer, e.g., HyperText Transfer Protocol ("HTTP"), Session Initiation Protocol ("SIP"), Simple Mail Transfer Protocol ("SMTP"), Post Office Protocol ("POP"), etc., are referred to as "higher layers" or "upper layers. As an example, "upper layer signaling" may refer to signaling exchange at the RRC sublayer 245.

The PHY layer 220 offers transport channels to the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC sublayer 245. The SDAP sublayer 240 offers QoS flows to the mobile core network 130 (e.g., 5GC). The RRC sublayer 245 provides for the addition, modification, and release of Carrier Aggregation and/or Dual Connectivity. The RRC sublayer 245 also manages the establishment, configuration, maintenance, and release of signaling radio bearers ("SRBs") and data radio bearers ("DRBs"). In certain embodiments, a RRC entity functions for detection of and recovery from radio link failure.

The NAS layer 250 is between the UE 205 and the AMF 215 in the 5GC. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., gNB 210) and carries information over the wireless portion of the network. While not depicted in FIG. 2, the IP layer exists above the NAS layer 250, a transport layer exists above the IP layer, and an application layer exists above the transport layer.

Regarding System Information Block

System Information (SI) is divided into a Master Information Block ("MIB") and a number of System Information Blocks ("SIBs") and Positioning System Information Block ("posSIBs") where:

- the MIB is always transmitted on the Broadcast Channel ("BCH") with a periodicity of 80 ms and repetitions made within 80 ms (TS 38.212, clause 7.1) and it includes parameters that are needed to acquire SIB1 from the cell. The first transmission of the MIB is scheduled in subframes as defined in TS 38.213, clause 4.1 and repetitions are scheduled according to the period of SSB;
- the SIB1 is transmitted on the downlink shared channel ("DL-SCH") with a periodicity of 160 ms and variable transmission repetition periodicity within 160 ms as specified in TS 38.213, clause 13. The default transmission repetition periodicity of SIB1 is 20 ms but the actual transmission repetition periodicity is up to network implementation. For SSB and control resource set ("CORESET") multiplexing pattern 1, SIB1 repetition transmission period is 20 ms. For SSB and CORESET multiplexing pattern 2/3, SIB1 transmission repetition period is the same as the SSB period (TS 38.213, clause 13). SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
- SIBs other than SIB1 and posSIBs are carried in SystemInformation (SI) messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area. which consists of one or several cells and is identified by systemInformationAreaID;
- The mapping of SIBs to SI messages is configured in schedulingInfoList, while the mapping of posSIBs to SI messages is configured in pos-SchedulingInfoList. Each SIB is contained only in a single SI message and each SIB and posSIB is contained at most once in that SI message;
- For a UE in RRC_CONNECTED, the network can provide system information through dedicated signaling using the RRCReconfiguration message, e.g., if the UE has an active Bandwidth Part ("BWP") with no common search space configured to monitor system information, paging, or upon request from the UE.
- For primary cells ("PCells") and secondary cell ("SCells"), the network provides the required SI by dedicated signaling, i.e., within an RRCReconfiguration message. Nevertheless, the UE shall acquire MIB of the PSCell to get System Frame Number ("SFN") timing of the Secondary Cell Group ("SCG"), which may be different from a Master Cell Group ("MCG"). Upon change of relevant SI for SCell, the network releases and adds the concerned SCell. For PSCell, the required SI can only be changed with Reconfiguration with Sync.

It may be noted that the physical layer imposes a limit to the maximum size a SIB can take. The maximum SIB1 or SI message size is 2976 bits.

FIG. 3 is a diagram illustrating a ServingCellConfigCommonSIB information element (IE) 300 according to one or more examples of the disclosure. The IE ServingCellConfigCommonSIB 300 is used to configure cell specific parameters of a UE's serving cell in SIB1. As described with respect to FIGS. 6, 7, 8, 9, 10, the apparatuses and methods of the present disclosure improve the ServingCellConfigCommonSIB information element by providing new parameters for SSB groups associated with multiple waveforms for a wireless communication network supporting a high frequency range.

FIG. 4 is a diagram illustrating various parameters 400 of a ServingCellConfigCommonSIB information element, according to one or more examples of the disclosure. The network informs the UEs about which SSBs are being transmitted using ssb-PositionsInBurst within ServingCellConfigCommonSIB. FIG. 4 describes certain aspects of the fields/parameters discoveryBurstWindow Length 402, ssb-PositionsInBurst 404, inOneGroup 406, and groupPresence 408, according to one or more examples of the disclosure.

The ServingCellConfigCommonSIB field discoveryBurstWindowLength 402 indicates the window length of the discovery burst in ms.

The ssb-PositionsInBurst 404 informs the UE which SSBs (and thereby the time domain positions of the SSBs) are being transmitted. Value 0 in the bitmap indicates that the corresponding SSB is not transmitted while value 1 indicates that the corresponding SSB is transmitted.

The inOneGroup 406 within ssb-PositionsInBurst 404 informs the UE which SSBs (and thereby the time domain positions of the SSBs) are being transmitted. Value 0 in the bitmap indicates that the corresponding SSB is not transmitted while value 1 indicates that the corresponding SSB is transmitted. When maximum number of SS/PBCH blocks per half frame equals to 4 as defined in TS 38.213, clause 4.1, only the 4 leftmost bits are valid: the UE ignores the 4 rightmost bits. When maximum number of SS/PBCH blocks per half frame equals to 8 as defined in TS 38.213, clause 4.1, all 8 bits are valid. The first/leftmost bit corresponds to SS/PBCH block index 0, the second bit corresponds to SS/PBCH block index 1, and so on. When maximum number of SS/PBCH blocks per half frame equals to 64 as defined in TS 38.213, clause 4.1, all 8 bits are valid: The first/leftmost bit corresponds to the first SS/PBCH block index in the group (i.e., to SSB index 0, 8, and so on): the second bit corresponds to the second SS/PBCH block index in the group (i.e., to SSB index 1, 9, and so on), and so on. Value 0 in the bitmap indicates that the corresponding SS/PBCH block is not transmitted while value 1 indicates that the corresponding SS/PBCH block is transmitted.

The field groupPresence 408, is present when maximum number of SS/PBCH blocks per half frame equals to 64 as defined in TS 38.213, clause 4.1. The first/leftmost bit corresponds to the SS/PBCH index 0-7, the second bit corresponds to SS/PBCH block 8-15, and so on. Value 0 in the bitmap indicates that the SSBs according to inOneGroup are absent. Value 1 indicates that the SS/PBCH blocks are transmitted in accordance with inOneGroup.

More details are presented below with respect to FIGS. 6, 7, 8, 9, 10, to describe how the apparatuses and methods of the present disclosure improve the ServingCellConfigCommonSIB information element by providing new parameters for determining SSB groups that are associated with multiple waveforms for a wireless communication network supporting a high frequency range.

FIG. 5 is a diagram illustrating a RACH-ConfigCommon IE 500, according to one or more examples of the disclosure. The RACH-ConfigCommon IE 500 is used to specify the cell specific random-access parameters. One or more modifications, for associating RACH procedures to with two or more selected waveforms using the RACH-ConfigCommon IE 500 are described below with respect to FIG. 11.

Solutions

Solution 1: Waveform-Based SSB Indexing & Grouping Signaling

According to solution 1, joint indexing of SSB is applied for different waveforms, where the association of SSB index to one of the waveforms is indicated via high layer signaling. Joint indexing of SSB implies that a single set of indices, for example 0-63 is applied, where some indices are associated with one waveform, while other indices are associated with another waveform.

FIG. 6 is a diagram illustrating one example implementation of a modified ServingCellConfigCommonSIB information element 600 for waveform-based SSB indexing & grouping signaling, according to one or more examples of the disclosure. A first implementation includes a modification 605 (highlighted a dotted line rectangle) to the ServingCellConfigCommonSIB information element 600.

In modification 605 a new parameter, ssb-Waveform-PositionsInBurst 602 is included. In various examples the new parameter, ssb-Waveform-PositionsInBurst 602, is signaled in the ServingCellConfigCommonSIB, to associate each SSB index to a particular type of waveform. Similar to SSB-PositionsInBurst parameter that indicates which SSB index is present ("1") and which one is absent ("0"), ssb-Waveform-PositionsInBurst 602 parameter is introduced, where a value of "0" associates a first waveform (e.g., type of waveform) with a first group of SSBs and a value of "1" associates a second waveform (e.g., different from the first waveform) with a second group of SSBs, where the association is indicated respectively by the SSB index. Similar mapping between bitmap for inOneGroup and groupPresence can be applied for indicating the association to different waveforms. One benefit of such an indication (e.g., as depicted in FIG. 6—Example 1-1) is flexibility in terms of associating a selected SSB index with a specific waveform type.

FIG. 7 is a diagram illustrating another example implementation of a modified ServingCellConfigCommonSIB information element 700 for alternating types of waveforms associated with SSB indices/beams in alternate periods, according to one or more examples of the disclosure. A second example implementation of a modification 705 to a ServingCellConfigCommonSIB information element 700 is highlighted in a dotted line rectangle. Similar to the modification 605 described above with respect to FIG. 6, the modification 705 includes the new parameter ssb-Waveform-PositionsInBurst 702 which is signaled in the ServingCellConfigCommonSIB information element 700. Additionally, the modification 705 includes a new parameter Waveform-Alternate 704 which may be enabled or disabled to indicate alternation of waveform according to SSB index.

In various examples, alternating of waveform on SSB indices/beams in alternate periods can be explicitly configured or pre-configured to the UE. For example, if SSB index 0 is configured with CP-OFDM in period 1 and SSB index 1 is configured with DFT-s-OFDM in period 1, then if alternation is configured, then SSB index 0 will use DFT-s-OFDM in period 2 and SSB index 1 will use CP-OFDM in period 2. And again, will alternate back to original configuration in period 3. In certain examples, this method may also be applied for more than two waveforms. If in period 1, SSB index 0 is configured with CP-OFDM, SSB index 1 with DFT-s-OFDM, and index 2 with SC-FDE, then in period 2, SSB index 0 is configured with DFT-s-OFDM, SSB index 1 with SC-FDE, and SSB index 2 with CP-OFDM and so on with sliding shift of the waveform type alternating for each period.

FIG. 8 is a diagram illustrating another example implementation of a modification 805 to the ServingCellConfigCommonSIB information element 800. In the example implementation, modification 805 provides for separate groups of SSB indices to be associated to different waveforms, according to one or more examples of the disclosure.

Certain parameters such as ssb-PositionsInBurst may be applied separately for each SSB set or a common configuration can be applied in absence of any of the parameter fields for second set. FIG. 8 depicts an implementation in which two sets are separately indicated and a corresponding parameter of ssb-Set1-PositionsInBurst 806 and ssb-Set2-PositionsInBurst 808 is separately indicated for each set. A new parameter ssb-Set1Waveform 802. ssb-Set2Waveform 804 is also included to indicate respectively which waveform is associated for each set.

In the example implementation depicted in FIG. 8, two sets or groups of SSBs are indicated for two waveforms and within each set or group, indexing is done respectively using new parameters ssb-Set1-PositionsInBurst 806 and ssb-Set2-PositionsInBurst 808. For example, in some implementations, a SSB set 1 is associated with waveform 1 with SSB indices from 0-N, SSB set 2 is associated with waveform 2 with SSB indices from 0-M, where N and M can be different values or same, up to network configuration and/or frequency range, carrier frequency, subcarrier spacing, frequency bands, etc.

As illustrated in FIG. 8, an example (e.g., Example 1-3) of two waveforms with CP-OFDM and DFT-s-OFDM is shown. However, other waveform candidates are also possible. Moreover, these embodiments could apply in general to more than two sets of waveforms as well. In some implementation, only a waveform for a second set needs to be indicated, while the waveform for a first set is a default waveform. In another implementation, no indication of the waveform association is indicated for each of the sets. Instead, fixed association can be pre-configured such as a first set is always associated with CP-OFDM and a second set is associated with DFT-s-OFDM. Or more generally, a first set is associated with multi-carrier waveform and a second set is associated with single carrier waveform.

In one or more embodiments, a single set of SSB indices are indicated for different waveform types, however, fixed association is pre-configured to the UE within the same SSB indices to the UE. For example, if 0-63 indices are indicated to the UE for Frequency Range 2 ("FR2"), then 0-31 indices can be configured for waveform type 1 and 32-63 indices associated with waveform type 2. The exact configuration of waveform for each type may be explicitly indicated as illustrated in FIG. 8 or alternatively, it may be pre-configured to the UE.

In certain embodiments, each of the SSB indicated to be present for one waveform type can be repeated for another waveform type. In this case, similar pattern, periodicity can be applied for the repetition with different waveform. Such repetition with a different waveform can be enabled by one or more indicated new parameters in ServingCellConfigCommonSIB.

Solution 2: Waveform-Based SSB Periodicity

In various examples, a second solution referred to herein as solution 2 is provided whereby SSBs transmitted with selected waveforms may also have different periodicities associated with them.

FIG. 9 is a diagram illustrating a further modified ServingCellConfigCommonSIB information element 900 for implementing waveform-periodicity according to one or more examples of the disclosure. An example modification 902 is highlighted in a dotted line rectangle.

An example illustration (e.g., Example 2-1) depicts that when SSBs can be transmitted with two different waveforms such as CP-OFDM and DFT-s-OFDM, two periodicities 904, 906 may be configured by the network to the UE in the ServingCellConfigCommonSIB information element 900 via RRC signaling.

In one or more implementations, when a frequency range support high frequencies greater than a certain threshold, such as for example, 52.6 GHz or 71 GHz or some other predetermined high frequency range (e.g., 24.25 GHz to 52.6 GHz, 52.6 GHz-71GHz, 64 GHz to 71 GHz, 95 GHz to 110 GHz, or any of various mm Wave bands under consideration for 5G and future networks), and both CP-OFDM and DFT-s-OFDM are configured for SSB transmission/reception, a first periodicity associated with SSBs using a first waveform such as CP-OFDM is longer (less frequent) in comparison with a second periodicity associated with SSBs using a different waveform such as DFT-s-OFDM (i.e., more frequent SSBs with DFT-s-OFDM). Accordingly, in various example implementations, SSBs with a single carrier (or single carrier like) waveform may configured/associated with a shorter periodicity in comparison to SSBs with a multi-carrier waveform.

In certain example implementations, a single periodicity is explicitly indicated to the UE for a first group of SSBs associated with first waveform and a second periodicity for a second group of SSBs associated with a second waveform is a factor of the periodicity indicated for SSB associated with first waveform type. In some examples, a UE is preconfigured with such a factor. The preconfigured factor may be based on one or more parameters such as the carrier frequency, frequency range, frequency raster, frequency band, subcarrier spacing, or combinations thereof. For example, for a FR beyond 71 GHz, if two waveforms such as CP-OFDM and DFT-s-OFDM are configured, and if the periodicity for the SSBs associated with CP-OFDM is 50 ms, then the periodicity for the SSBs associated with DFT-s-OFDM may be configured to be a factor of ⅕ of the periodicity for the SSBs associated with CP-OFDM i.e., 10 ms.

FIG. 10 is a diagram illustrating another modified ServingCellConfigCommonSIB information element 1000 for implementing waveform-periodicity according to one or more examples of the disclosure. An example modification 1002 is highlighted in a dotted line rectangle.

In some examples, a factor for preconfiguring the UE (as described above with respect to FIG. 9) is explicitly indicated in the RRC configuration as illustrated in FIG. 10, (Example 2-2) by the parameter ssb-PeriodicityFactorServingCell 1004.

Solution 3: Waveform-Based ROs

FIG. 11 is a diagram illustrating a modified RACH-ConfigCommon information element 1100, according to one or more examples of the disclosure. An example modification 1102 is highlighted in a dotted line rectangle.

In various embodiments, a waveform for the RO can be determined based on the associated waveform of the received SSB beam. In one or more implementations, if the SSB beam (index) is received using one waveform by the UE, then UE is expected to transmit on the associated RO(s) with the same waveform. In this case, no explicit configuration for RACH is needed to indicate which waveform to use, dependency based on SSB waveform is assumed.

In some embodiments, at least two ROs are associated with an SSB beam. The first RO is associated with the first waveform and a second RO is associated with second waveform. In certain implementations, this implementation is pre-configured to the UE. In certain implementations, RACH configuration is enhanced to indicate the waveform associated with a RO.

In some examples, as depicted in RACH-ConfigCommon information element 1100, a UE is not expected to have two ROs frequency division multiplexed ("FDMed") when they are associated with two different waveforms.

In various embodiments, when the configured/associated waveform with RO is single carrier waveform, then indication for subcarrier spacing is not included in the RACH-ConfigCommon. In some embodiments, if subcarrier spacing is not included in the RACH-ConfigCommon, then a UE can assume that single carrier waveform is used for RACH transmissions. In certain embodiments, the UE is configured in RACH-ConfigCommon 1104 to use multiple ROs for its multiple RACH transmissions, each transmitted with the corresponding waveform indicated in ServingCellConfigCommonSIB. In various implementations, a parameter RACH-OccasionWaveform 1106 indicates the type of waveform for the selected RO.

The solutions described herein significantly improve transmission of SSBs and ROs with multiple waveforms for higher frequencies in various ways.

Solution 1 as disclosed herein provides for SSB beams/index grouping and corresponding signaling that support multi-waveform transmission/reception of SSB for both initial access and non-initial access procedures. One benefit a solution of this type is flexible mapping/association of SSB index to one of the multiple waveforms supported.

Solution 2 as disclosed herein provides SSB periodicity specific to waveform to allow for adaptive transmission/reception of SSB beams with multiple waveforms depending up on frequency range, carrier frequency, subcarrier spacing, frequency raster, and combinations thereof. One benefit of a solution of this type is to increase (or decrease) the periodic transmissions of SSB with specific waveform type that is more suitable to deployment scenario, frequency range and/or UEs distribution across multiple waveforms.

Solution 3 as disclosed herein provides waveform determination for ROs based on a waveform associated with a received SSB. One benefit of a solution of this type is to allow a UE to use suitable waveform UL transmission in one or multiple steps of RACH procedure based on downlink ("DL") reception and avoid explicit indication of waveform (when not required).

It may be noted that in some examples, various aspects of the solutions disclosed herein may be used alternatively. In other examples, certain aspects of the solutions disclosed herein may be used in combination.

Figure 12:
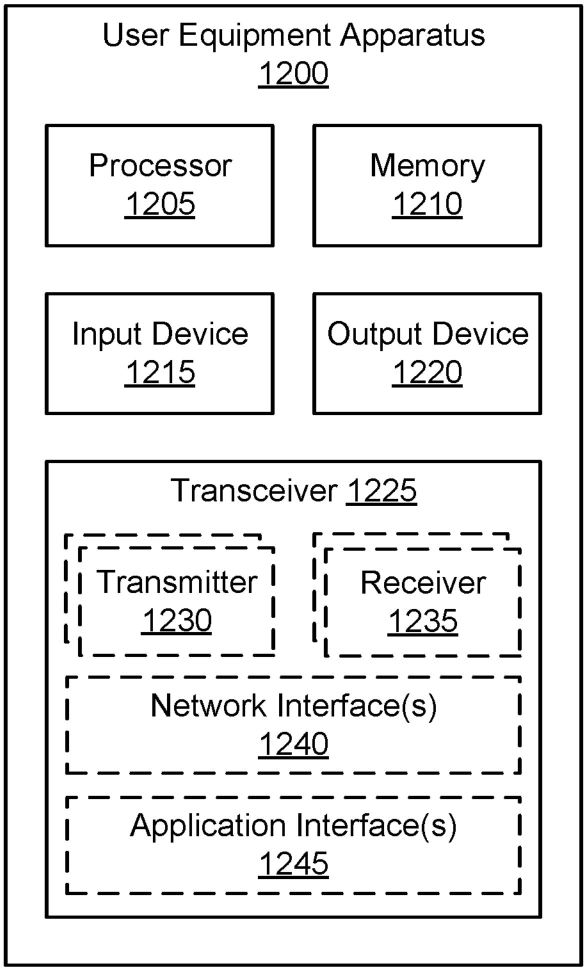
FIG. 12 is a block diagram illustrating one embodiment of a user equipment apparatus that may be used for SSB groups associated with multiple waveforms for a wireless communication network supporting a high frequency range, according to one or more examples of the disclosure.

FIG. 12 depicts a user equipment apparatus 1200 that may be used for SSBs and ROs with multiple waveforms for high frequency range, according to embodiments of the disclosure. In various embodiments, the user equipment apparatus 1200 is used to implement one or more of the solutions described above. The user equipment apparatus 1200 may be one embodiment of a UE, such as the remote unit 105 and/or the UE 205, as described above. Furthermore, the user equipment apparatus 1200 may include a processor 1205, a memory 1210, an input device 1215, an output device 1220, and a transceiver 1225. In some embodiments, the input device 1215 and the output device 1220 are combined into a single device, such as a touchscreen. In certain embodiments, the user equipment apparatus 1200 may not include any input device 1215 and/or output device 1220. In various embodiments, the user equipment apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more network units 121. Additionally, the transceiver 1225 may support at least one network interface 1240 and/or application interface 1245. The application interface(s) 1245 may support one or more APIs. The network interface(s) 1240 may support 3GPP reference points, such as Uu and PC5. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 1205 executes instructions stored in the memory 1210 to perform the methods and routines described herein.

The processor 1205 is communicatively coupled to the memory 1210, the input device 1215, the output device 1220, and the transceiver 1225. In certain embodiments, the processor 1205 may include an application processor (also known as "main processor") which manages application-domain and operating system ("OS") functions and a baseband processor (also known as "baseband radio processor") which manages radio functions. In various embodiments, the processor 1205 controls the user equipment apparatus 1200 to implement the above described UE behaviors for SSBs and ROs with multiple waveforms for high frequency range The memory 1210, in one embodiment, is a computer readable storage medium. In some embodiments, the memory 1210 includes volatile computer storage media. For example, the memory 1210 may include a RAM, including Dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to SSBs and ROs with multiple waveforms for high frequency range. For example, the memory 1210 may store parameters, configurations, resource assignments, policies, and the like as described above. In certain embodiments, the memory 1210 also stores program code and related data, such as an operating system or other controller algorithms operating on the user equipment apparatus 1200, and one or more software applications.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the user equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. The transceiver 1225 may be used to provide UL communication signals to a network unit 121 and to receive DL communication signals from the network unit 121, as described herein. Similarly, the transceiver 1225 may be used to transmit and receive SL signals (e.g., V2X communication), as described herein. Although only one transmitter 1230 and one receiver 1235 are illustrated, the user equipment apparatus 1200 may have any suitable number of transmitters 1230 and receivers 1235. Further, the transmitter(s) 1230 and the receiver(s) 1235 may be any suitable type of transmitters and receivers. In one embodiment, the transceiver 1225 includes a first transmitter/receiver pair used to communicate with a wireless communication network over licensed radio spectrum and a second transmitter/receiver pair used to communicate with a wireless communication network over unlicensed radio spectrum.

In certain embodiments, the first transmitter/receiver pair used to communicate with a wireless communication network over licensed radio spectrum and the second transmitter/receiver pair used to communicate with a wireless communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1225, transmitters 1230, and receivers 1235 may be implemented as physically separate components that access a shared hardware resource and/or software resource, such as for example, the network interface 1240.

In various embodiments, one or more transmitters 1230 and/or one or more receivers 1235 may be implemented and/or integrated into a single hardware component, such as a multi-transceiver chip, a system-on-a-chip, an application specific integrated circuit ("ASIC"), or other type of hardware component. In certain embodiments, one or more transmitters 1230 and/or one or more receivers 1235 may be implemented and/or integrated into a multi-chip module. In some embodiments, other components such as the network interface 1240 or other hardware components/circuits may be integrated with any number of transmitters 1230 and/or receivers 1235 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

In one or more examples, the transceiver 1225 may be used for receiving from a radio access network supporting a high frequency range, a first configuration including an indication that a first group of SSBs is associated with a first waveform: receiving from the RAN a second configuration including an indication that at least a second group of SSBs is associated with at least a second waveform different from the first waveform; and determining a waveform associated with at least one received SSB from the network based at least in part on an SSB index assigned to indicate the waveform associated with the at least one received SSB.

In certain examples, the transceiver 1225 may be used for determining a periodicity that configured by a network unit 121 for an SSB group associated with a selected waveform based on a frequency range, a carrier frequency, a frequency raster, a subcarrier spacing, or a combination thereof.

In various examples, the processor 1205 may be used for determining for each of one or more repeated SSB indices that a waveform is associated with one or more separate ROs and that each RO is associated with the waveform corresponding to the at least one received SSB. In some examples, the processor 1205 the processor autonomously selects one of the two ROs associated with the at least one received SSB and the transceiver 1225 the transceiver performs an uplink ("UL") transmission during a RACH procedure using the respective waveform associated with one of the two selected ROs. The transceiver 1225 may performs an uplink ("UL") transmission during a RACH procedure using a single carrier-based waveform.

Figure 13:
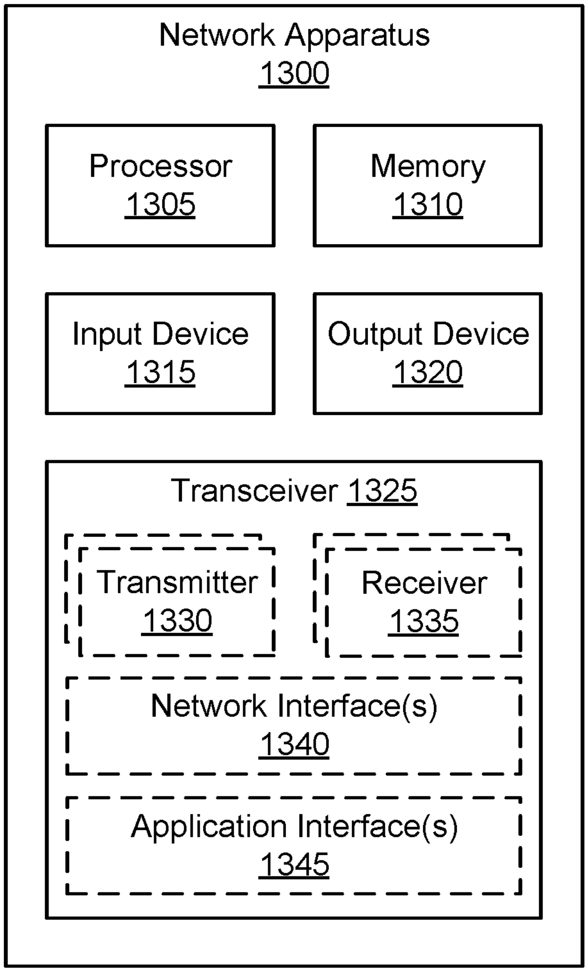
FIG. 13 is a block diagram illustrating one embodiment of a network apparatus that may be used for SSB groups associated with multiple waveforms for a wireless communication network supporting a high frequency range, according to one or more examples of the disclosure.

FIG. 13 depicts one embodiment of a network apparatus 1300 that may be used for SSBs and ROs with multiple waveforms for high frequency range, according to embodiments of the disclosure. In some embodiments, the network apparatus 1300 may be one embodiment of a RAN node and its supporting hardware, such as the network unit 121 and/or the gNB 210, described above. Additionally, the network apparatus 1300 may include a processor 1305, a memory 1310, an input device 1315, an output device 1320, and a transceiver 1325. In certain embodiments, the network apparatus 1300 does not include any input device 1315 and/or output device 1320.

As depicted, the transceiver 1325 includes at least one transmitter 1330 and at least one receiver 1335. Here, the transceiver 1325 communicates with one or more remote units 105. Additionally, the transceiver 1325 may support at least one network interface 1340 and/or application interface 1345. The application interface(s) 1345 may support one or more APIs. The network interface(s) 1340 may support 3GPP reference points, such as Uu, N1, N2, and/or N3 interfaces. Other network interfaces 1340 may be supported, as understood by one of ordinary skill in the art.

The processor 1305, in one embodiment, may include any known controller capable of executing computer-readable instructions and/or capable of performing logical operations. For example, the processor 1305 may be a microcontroller, a microprocessor, a Central Processing Unit ("CPU"), a Graphics Processing Unit ("GPU"), an auxiliary processing unit, a Field Programmable Gate Array ("FPGA"), a Digital Signal Processor ("DSP"), a co-processor, an application-specific processor, or similar programmable controller. In some embodiments, the processor 1305 executes instructions stored in the memory 1310 to perform the methods and routines described herein.

The processor 1305 is communicatively coupled to the memory 1310, the input device 1315, the output device 1320, and the transceiver 1325. In certain embodiments, the processor 1305 may include an application processor (also known as "main processor") which manages application-domain and operating system ("OS") functions and a baseband processor (also known as "baseband radio processor") which manages radio function. In various embodiments, the processor 1305 controls the network apparatus 1300 to implement the above described network entity behaviors for SSBs and ROs with multiple waveforms for high frequency range.

The memory 1310, in one embodiment, is a computer readable storage medium. In some embodiments, the memory 1310 includes volatile computer storage media. For example, the memory 1310 may include a RAM, including dynamic RAM ("DRAM"), synchronous dynamic RAM ("SDRAM"), and/or static RAM ("SRAM"). In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data relating to SSBs and ROs with multiple waveforms for high frequency range. For example, the memory 1310 may store parameters, configurations, resource assignments, policies, and the like as described above. In certain embodiments, the memory 1310 also stores program code and related data, such as an operating system ("OS") or other controller algorithms operating on the network apparatus 1300, and one or more software applications.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, may include any known electronically controllable display or display device. The output device 1320 may be designed to output visual, audible, and/or haptic signals. In some embodiments, the output device 1320 includes an electronic display capable of outputting visual data to a user. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all or portions of the output device 1320 may be integrated with the input device 1315. For example, the input device 1315 and output device 1320 may form a touchscreen or similar touch-sensitive display. In other embodiments, all or portions of the output device 1320 may be located near the input device 1315.

As discussed above, the transceiver 1325 may communicate with one or more remote units and/or with one or more interworking functions that provide access to one or more PLMNs. The transceiver 1325 may also communicate with one or more network functions (e.g., in the mobile core network 130). The transceiver 1325 operates under the control of the processor 1305 to transmit messages, data, and other signals and also to receive messages, data, and other signals. For example, the processor 1305 may selectively activate the transceiver (or portions thereof) at particular times in order to send and receive messages.

The transceiver 1325 may include one or more transmitters 1330 and one or more receivers 1335. In certain embodiments, the one or more transmitters 1330 and/or the one or more receivers 1335 may share transceiver hardware and/or circuitry. For example, the one or more transmitters 1330 and/or the one or more receivers 1335 may share antenna(s), antenna tuner(s), amplifier(s), filter(s), oscillator (s), mixer(s), modulator/demodulator(s), power supply, and the like. In one embodiment, the transceiver 1325 implements multiple logical transceivers using different communication protocols or protocol stacks, while using common physical hardware.

In one or more examples, the transceiver 1325 may be used for transmitting SSB configurations from a radio access network supporting a high frequency range to a UE. For example, the transceiver 1325 may transmit a first configuration including an indication that a first group of SSBs is associated with a first waveform. The transceiver 1325 may further transmit a second configuration including an indication that at least a second group of SSBs is associated with at least a second waveform different from the first waveform. The processor 1305 may be used transmit waveform associated with the at least one received SSB.

In certain examples, the transceiver 1325 may be used for configuring a periodicity for an SSB group associated with a selected waveform based on a frequency range, a carrier frequency, a frequency raster, a subcarrier spacing, or a combination thereof.

In various examples, one or more repeated SSB indices may be configured such that a waveform is associated with one or more separate ROs and that each RO is associated with the waveform corresponding to the at least one received SSB. The transceiver 1325 may be used to receive an UL transmission with the associated waveform in a RACH procedure.

Figure 14:
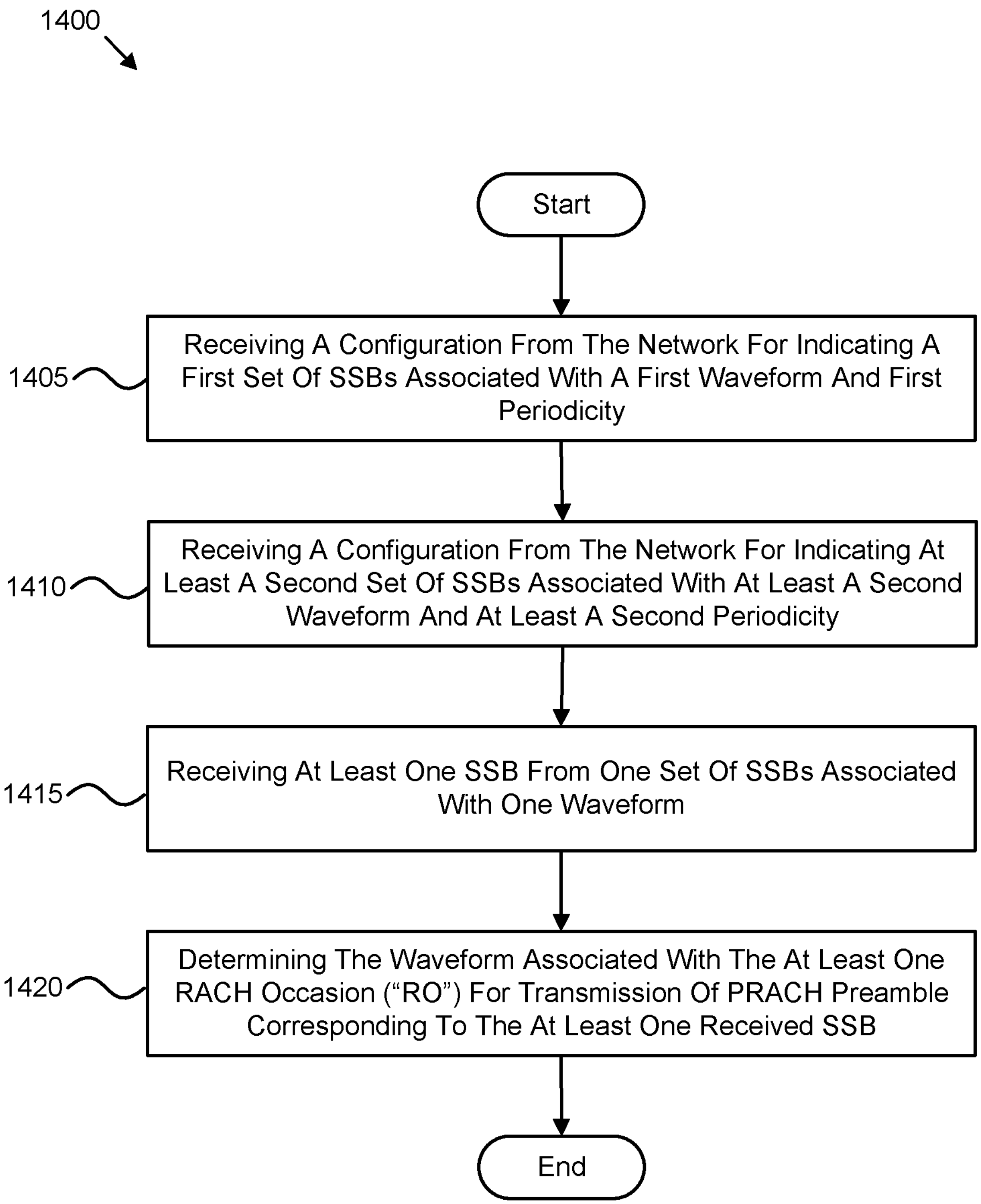
FIG. 14 is a flowchart diagram illustrating one embodiment of a method for random access channel (RACH) occasions ("ROs") involving SSB groups associated with multiple waveforms for a wireless communication network supporting a high frequency range, according to one or more examples of the disclosure.

FIG. 14 is a flowchart diagram of a method 1400 for SSBs and ROs with multiple waveforms for high frequency range. The method 1400 may be performed by a UE as described herein, for example, the remote unit 105, and/or the user equipment apparatus 1200. In some embodiments, the method 1400 may be performed by a processor executing program code, for example, a microcontroller, a microprocessor, a CPU, a GPU, an auxiliary processing unit, a FPGA, or the like.

In various examples, the method 1400 includes receiving 1405 a first configuration from a network for indicating a first set of SSBs associated with a first waveform and first periodicity. The method 1400 continues and includes receiving 1410 a configuration from the network for indicating at least a second set of SSBs associated with at least a second waveform and at least a second periodicity. The method 1400 further includes 1415 receiving at least one SSB from one set of SSBs associated with one waveform. The method 1400 continues and includes 1420 determining the waveform associated with the at least one RO for transmission of PRACH preamble corresponding to the at least one received SSB. In various examples, one or more apparatuses may perform the disclosed methods.

Figure 15:
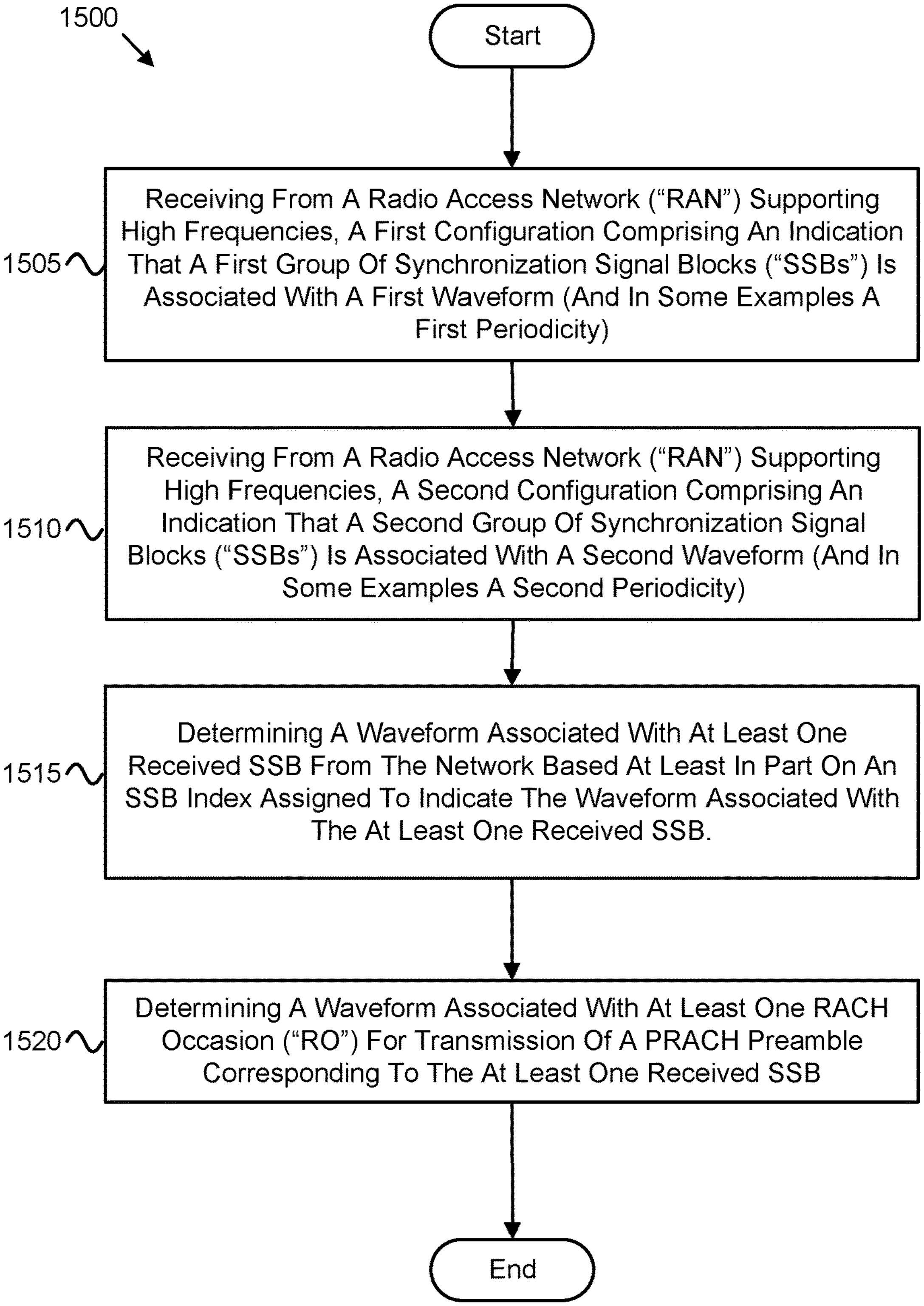
FIG. 15 is a flowchart diagram illustrating one embodiment of a method for SSB groups associated with multiple waveforms for a wireless communication network supporting a high frequency range, according to one or more examples of the disclosure.

FIG. 15 is a flowchart diagram illustrating one embodiment of a method for SSB groups associated with multiple waveforms for a wireless communication network supporting a high frequency range, according to one or more examples of the disclosure.

The method 1500 may be performed by a UE as described herein, for example, the remote unit 105, and/or the user equipment apparatus 1200. In some embodiments, the method 1500 may be performed by a processor executing program code, for example, a microcontroller, a microprocessor, a CPU, a GPU, an auxiliary processing unit, a FPGA, or the like.

In various examples, the method 1500 includes receiving 1505 from a RAN supporting a high frequency range: a first configuration including an indication that a first group of SSBs is associated with a first waveform. The method 1500 continues and includes, in one or more examples, receiving 1510 from the RAN, a second configuration including an indication that a second group of SSBs is associated with a second waveform different from the first waveform. The method 1500 continues and in certain examples, includes determining 1515 a waveform associated with at least one received SSB based at least in part on an SSB index assigned to indicate the waveform associated with the at least one received SSB. In certain examples, the method 1500 ends. In some examples, the method 1500 continues and includes determining 1520, a waveform associated with at least one RO for transmission of a PRACH preamble corresponding to the at least one received SSB. In various examples, the method 1500 ends.

In some examples, a complementary method (not shown) similar to the method 1500 may be performed by a network unit 121, a RAN 120, or a network apparatus 1300 where the method at a network unit supporting a high frequency range includes: transmitting to a UE, a first configuration comprising an indication that a first group of SSBs is associated with a first waveform and a second configuration comprising an indication that a second group of SSBs is associated with a second waveform different from the first waveform. The method further includes associates a waveform with at least one received SSB based at least in part on an SSB index.

Additionally, various examples of the present disclosure are described in the following examples statements.

In various examples, an apparatus for wireless communication over a high frequency range, at a UE, includes a transceiver that receives from a first configuration comprising a first indication that a first group of SSBs is associated with a first waveform: a second configuration comprising a second indication that a second group of SSBs is associated with a second waveform different than the first waveform: and a processor that determines a respective waveform associated with a received SSB based at least in part on an SSB index indicating the respective waveform associated with the received SSB.

In one or more examples, a method for wireless communication over a high frequency range, at a UE, includes receiving: a first configuration comprising a first indication that a first group of SSB is associated with a first waveform: a second configuration comprising a second indication that a second group of SSBs is associated with a second waveform different than the first waveform: and determining a waveform associated with a received SSB based at least in part on an SSB index indicting that the waveform is associated with the received SSB.

In some examples, for the apparatus at a UE and/or the method at a UE the following statements apply.

In certain examples, the first waveform associated with the first group of SSBs comprises a CP-OFDM waveform and the second waveform associated with the second group of SSBs comprises a DFT-s-OFDM waveform.

In some examples, the first waveform associated with the first group of SSBs comprises an OFDM-based multi-carrier waveform and the second waveform associated with the second group of SSBs comprises a single carrier-based waveform.

In various examples, the first group of SSBs, the second group of SSBs, or both, correspond to a set of SSB indices: the set of SSB indices are separately assigned: a quantity of SSB indices of the set of SSB indices are separately configured.

In one or more examples, the first group of SSBs, the second group of SSBs, or both, correspond to a respective SSB pattern.

In certain examples, the first group of SSBs is associated with a first SSB pattern and the second group of SSBs is associated with a second SSB pattern different than the first SSB pattern.

In some examples, SSB indices associated with different waveforms are assigned jointly to multiple groups of SSBs, and a total range of the SSB indices is equal to a sum of the SSBs within each group.

In some examples, an SSB index is configured to be associated with an SSB beam that is repeated using different waveforms.

In various examples, a periodicity associated with the first group of SSBs, the second group of SSBs, or both, is based on a frequency range, a carrier frequency, a frequency raster, or a subcarrier spacing, or a combination thereof.

In one or more examples, each of one or more repeated SSB indices with a different waveform is associated with one or more separate ROs and each RO is associated with the waveform corresponding to the at least one received SSB.

In certain examples, at least two ROs are associated with the at least one received SSB, and wherein the each of the ROs is associated with different waveform.

In some examples, the method includes selecting one of the two ROs associated with the at least one received SSB and using the waveform associated with a selected RO for UL transmission in a RACH procedure.

In one or more examples, in response to a RACH configuration being received without a subcarrier spacing value, a single carrier-based waveform is assumed for UL transmission in a RACH procedure.

In various examples, an apparatus for wireless communication over a high frequency range includes: a transceiver that transmits a first configuration comprising a first indication that a first group of SSBs is associated with a first waveform and a second configuration comprising a second indication that a second group of SSBs is associated with a second waveform different than the first waveform. The apparatus includes a processor that associates a respective waveform with a transmitted SSB based at least in part on an SSB index, the SSB index indicating that the waveform is associated with the transmitted SSB.

In some examples, a method for wireless communication over a high frequency range, e.g., at a network unit, includes: transmitting a first configuration comprising a first indication that a first group of SSBs is associated with a first waveform and a second configuration comprising a second indication that a second group of SSBs is associated with a second waveform different from the first waveform. The method further includes associating a waveform with a transmitted SSB based at least in part on an SSB index.

In certain examples, for the apparatus at the network unit or the method at a network unit the following statements apply.

In some examples, the first waveform associated with the first group of SSBs comprises a CP-OFDM waveform and the second waveform associated with the second group of SSBs comprises a DFT-s-OFDM waveform.

In one or more examples, the first waveform associated with the first group of SSBs comprises an OFDM-based multi-carrier waveform and the second waveform associated with the second group of SSBs comprises a single carrier-based waveform.

In various examples, the first group of SSBs, the second group of SSBs, or both, correspond to a set of SSB indices, where the set of SSB indices are separately assigned, and where a quantity of SSB indices of the set of SSB indices are separately configured.

In one or more examples, a first group of SSBs, a second group of SSBs, or both, correspond to a respective SSB pattern.

In some examples, SSB indices are assigned jointly to multiple groups of SSBs associated with different waveforms, wherein a total range of the SSB indices is equal to a sum of the SSBs within each group.

In some examples, an SSB index is associated with an SSB beam that is repeated using different waveforms.

In various examples, a periodicity associated with the first group of SSBs is based, at least in part, on a frequency range, a carrier frequency, a frequency raster, or a subcarrier spacing, or a combination thereof.

In one or more examples, each of one or more repeated SSB indices with a different waveform is associated with one or more separate ROs and each RO is associated with the waveform corresponding to the at least one received SSB.

In certain examples, at least two ROs are associated with the at least one received SSB, and wherein the each of the ROs is associated with different waveform.

In some examples, the method includes selecting one of the two ROs associated with the at least one received SSB and using the waveform associated with a selected RO for UL transmission in a RACH procedure.

Examples, implementations, or embodiments may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a configuration message comprising synchronization signal block (SSB) index, the SSB index identifying each SSB within a set of SSBs that are part of a first group of SSBs associated with a first waveform type and identifying each SSB within the set of SSBs that are part of a second group of SSBs associated with a second waveform type, the set of SSBs comprising each SSB that a network unit is capable of transmitting;
receive a group of SSBs from a network unit; and
determine, for each received SSB of the group of SSBs, a respective waveform type associated with the received SSB based at least in part on the SSB index.

2. The UE of claim 1, wherein:
the first waveform associated with the first group of SSBs comprises a cyclic prefix orthogonal frequency division multiplexing (CP-OFDM) waveform; and
the second waveform associated with the second group of SSBs comprises a discrete Fourier transform spread orthogonal frequency division multiplexing (DFT-s-OFDM) waveform.

3. The UE of claim 1, wherein the first waveform associated with the first group of SSBs comprises an OFDM-based multi-carrier waveform and the second waveform associated with the second group of SSBs comprises a single carrier-based waveform.

4. The UE of claim 1, wherein the first group of SSBs, the second group of SSBs, or both, correspond to a set of SSB indices, wherein the set of SSB indices are separately assigned, and wherein a quantity of SSB indices of the set of SSB indices are separately configured.

5. The UE of claim 4, wherein the first group of SSBs, the second group of SSBs, or both, correspond to a respective SSB pattern.

6. The UE of claim 5, wherein the first group of SSBs is associated with a first SSB pattern, and wherein the second group of SSBs is associated with a second SSB pattern different than the first SSB pattern.

7. The UE of claim 4, wherein SSB indices are assigned jointly to multiple groups of SSBs associated with different waveforms, wherein a total range of the SSB indices is equal to a sum of the SSBs within each group.

8. The UE of claim 1, wherein the at least one processor is configured to cause the UE to determine an association between an SSB beam and the SSB index indicating the respective waveform associated with the received SSB.

9. The UE of claim 1, wherein a periodicity associated with the first group of SSBs, the second group of SSBs, or both, is based at least in part on a frequency range, a carrier frequency, a frequency raster, or a subcarrier spacing, or a combination thereof.

10. The UE of claim 9, wherein:
each of one or more repeated SSB indices with a different waveform is associated with one or more separate random access channel (RACH) occasions (ROs); and
each RO is associated with the respective waveform corresponding to the at least one received SSB.

11. The UE of claim 10, wherein at least two ROs are associated with the at least one received SSB, and wherein each of the ROs is associated with a different waveform.

12. The UE of claim 11, wherein:
the at least one processor is configured to cause the UE to autonomously select one of the two ROs associated with the at least one received SSB; and
the at least one processor is configured to cause the UE to perform an uplink (UL) transmission during a RACH procedure using the respective waveform associated with one of the two selected ROs.

13. The UE of claim 10, wherein in response to a RACH configuration being received without a subcarrier spacing value, the at least one processor is configured to cause the UE to perform an uplink (UL) transmission during a RACH procedure using a single carrier-based waveform.

14. A processor for wireless communication, comprising:
at least one controller coupled with at least one memory and configured to cause the processor to:
receive a configuration message comprising synchronization signal block (SSB) index, the SSB index identifying each SSB within a set of SSBs that are part of a first group of SSBs associated with a first waveform type and identifying each SSB within the set of SSBs that are part of a second group of SSBs associated with a second waveform type, the set of SSBs comprising each SSB that a network unit is capable of transmitting;
receive a group of SSBs from a network unit; and
determine, for each received SSB of the group of SSBs, a respective waveform type associated with the received SSB based at least in part on the SSB index.

15. A base station, comprising:
at least one memory; and
at least one processor coupled with the at least one memory and configured to cause the base station to:
transmit a configuration message comprising synchronization signal block (SSB) index, the SSB index identifying each SSB within a set of SSBs that are part of a first group of SSBs associated with a first waveform type and identifying each SSB within the set of SSBs that are part of a second group of SSBs associated with a second waveform type, the set of SSBs comprising each SSB that a network unit is capable of transmitting;
transmit a group of SSBs to a user equipment (UE), wherein, for each transmitted SSB of the group of SSBs, a respective waveform type associated with the transmitted SSB is configured to be determined when received based at least in part on an SSB index of the transmitted SSB.

16. The processor of claim 14, wherein:

the first waveform associated with the first group of SSBs comprises a cyclic prefix orthogonal frequency division multiplexing (CP-OFDM) waveform; and the second waveform associated with the second group of SSBs comprises a discrete Fourier transform spread orthogonal frequency division multiplexing (DFT-s-OFDM) waveform.

17. The processor of claim 14, wherein the first waveform associated with the first group of SSBs comprises an OFDM-based multi-carrier waveform and the second waveform associated with the second group of SSBs comprises a single carrier-based waveform.

18. The processor of claim 14, wherein the first group of SSBs, the second group of SSBs, or both, correspond to a set of SSB indices, wherein the set of SSB indices are separately assigned, and wherein a quantity of SSB indices of the set of SSB indices are separately configured.

19. The processor of claim 18, wherein the first group of SSBs, the second group of SSBs, or both, correspond to a respective SSB pattern.

20. A method performed by a base station, the method comprising:

transmitting a configuration message comprising synchronization signal block (SSB) index, the SSB index identifying each SSB within a set of SSBs that are part of a first group of SSBs associated with a first waveform type and identifying each SSB within the set of SSBs that are part of a second group of SSBs associated with a second waveform type, the set of SSBs comprising each SSB that a network unit is capable of transmitting;

transmitting a group of SSBs to a user equipment (UE), wherein, for each transmitted SSB of the group of SSBs, a respective waveform type associated with the transmitted SSB is configured to be determined when received based at least in part on an SSB index of the transmitted SSB.

* * * * *